(12) United States Patent
Watkins et al.

(10) Patent No.: US 6,942,175 B2
(45) Date of Patent: Sep. 13, 2005

(54) WINDING APPARATUS HAVING BERNOULLI GUIDE SHOE LEADING INTO ROLLER-CORE NIP AND METHOD

(76) Inventors: Joseph A. Watkins, Eastman Kodak Company, 343 State St., Rochester, NY (US) 14650; Stephen M. Reinke, Eastman Kodak Company, 343 State St., Rochester, NY (US) 14650

( * ) Notice: Subject to any disclaimer, the term of this patent is extended or adjusted under 35 U.S.C. 154(b) by 3 days.

(21) Appl. No.: 10/460,552

(22) Filed: Jun. 12, 2003

(65) Prior Publication Data

US 2004/0251372 A1 Dec. 16, 2004

(51) Int. Cl.$^7$ .......................... B65H 19/28; B65H 75/28
(52) U.S. Cl. .................. 242/532.2; 242/532.7; 242/332.3; 242/548; 226/97.3
(58) Field of Search .................. 242/532, 532.7, 242/532.2, 332.3, 615.1, 548, 581; 226/97.3

(56) References Cited

U.S. PATENT DOCUMENTS

| | | | |
|---|---|---|---|
| 3,527,424 A | * | 9/1970 | Goldman .................. 242/532.2 |
| 3,559,301 A | | 2/1971 | Fraser |
| 3,567,093 A | | 3/1971 | Johnson |
| 3,642,221 A | | 2/1972 | Hellemans |
| 3,904,148 A | | 9/1975 | Cloud et al. |
| 3,918,092 A | | 11/1975 | Rueger |
| 4,147,287 A | | 4/1979 | Reba |
| 4,394,990 A | * | 7/1983 | Kildal et al. ................. 242/532 |
| 4,909,870 A | | 3/1990 | Gould et al. |
| 4,913,049 A | | 4/1990 | Sainio |
| 5,111,241 A | | 5/1992 | Kralles |
| 5,310,107 A | * | 5/1994 | Todd et al. .............. 242/615.1 |
| 5,383,622 A | | 1/1995 | Kohler |
| 5,461,450 A | | 10/1995 | Long et al. |
| 5,891,309 A | | 4/1999 | Page et al. |
| 6,004,432 A | * | 12/1999 | Page et al. .................. 162/281 |
| 6,241,179 B1 | | 6/2001 | Hachiya et al. |
| 6,443,389 B1 | | 9/2002 | Palone |

FOREIGN PATENT DOCUMENTS

DE          101 48 502          4/2003

* cited by examiner

*Primary Examiner*—Kathy Matecki
*Assistant Examiner*—Sang Kim

(57) ABSTRACT

A winding apparatus has a rotary element, such as a core, that is rotatable about a winding axis. A roller is disposed adjoining the rotary element. The roller and rotary element together define a nip. A guide shoe has a chute wall and a plenum. The chute wall is aligned with the nip. The chute wall has an inner end disposed between the roller and the rotary element and an outer end spaced from the roller. The chute wall has a plurality of bores communicating with the plenum. In use, gas blown through the bores propels a web to the nip in a fluid film. The free end of the web is guided from an outfeed end of the nip in a loop to a second position adjoining the inner end of the guide shoe. During the guiding, the rotary element is rotated against the loop. This continues until the web overlaps and is cinched.

31 Claims, 15 Drawing Sheets

WINDING APPARATUS HAVING BERNOULLI GUIDE SHOE LEADING INTO ROLLER-CORE NIP AND METHOD

FIELD OF THE INVENTION

The invention relates to equipment and methods for cinching and winding webs and more particularly relates to web winding equipment having a Bernoulli flow path and related method.

BACKGROUND OF THE INVENTION

In many kinds of web winding apparatus, a web is directed through a nip between two rotary elements and around one of the rotary elements. Often this is done as an initial step during the cinching of the web to the respective rotary element. This can be cumbersome in some cases, in which movement of the web through the nip requires one or both of the rotary elements to be driven and the cinching requires the web to be stopped and/or requires a manual operation. Additional problems exist in particular uses, in which is desirable to protect the free end of the web from damage. This makes cinching by means of inserting the free end of the web in a slot in the rotary element or other deformation or damage to the web due to cinching unacceptable. An example of this kind of use is cinematography related film winding, in which the free end of the film can have otherwise usable images.

Bernoulli effect guides and supports have long been used to support and move webs while protecting the webs from damaging contact. U.S. Pat. Nos. 3,559,301 and 3,567,093 disclose Bernoulli effect guides for straight and curved paths. U.S. Pat. Nos. 3,904,148 and 3,918,092 disclose magnetic tape self-threading about a helical path containing a rotating head. The tape is pushed through the constrained path and the Bernoulli effect is used to constrain the tape to a particular path along a plate.

It would thus be desirable to provide winding apparatus and methods, in which a web is guided by the Bernoulli effect and is directed through a nip between two rotary elements and around one of the rotary elements.

SUMMARY OF THE INVENTION

The invention is defined by the claims. The invention, in broader aspects, provides a winding apparatus having a rotary element, such as a core, that is rotatable about a winding axis. A roller is disposed adjoining the rotary element. The roller and rotary element together define a nip. A guide shoe has a chute wall and a plenum. The chute wall is aligned with the nip. The chute wall has an inner end disposed between the roller and the rotary element and an outer end spaced from the roller. The chute wall has a plurality of bores communicating with the plenum. In use, gas blown through the bores propels a web to the nip in a fluid film. The free end of the web is guided from an outfeed end of the nip in a loop to a second position adjoining the inner end of the guide shoe. During the guiding, the rotary element is rotated against the loop. This continues until the web overlaps and is cinched.

It is an advantageous effect of the invention that improved winding apparatus and methods are provided, in which a fluid flow guide shoe directs and propels a free end of a web to a nip.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The term "web 14" is used herein to refer to a thin membrane of photographic film, coated or uncoated paper or plastic, or other material. The web 14 has a uniform transverse dimension, within limits required for a particular use. The length of the web 14 is determinate or indeterminate, as appropriate for a particular use. For example, the web 14 can be a short sheet of known length or a long roll of unknown length.

The term "rotary element" is used to refer to a rotating structure or endless belt that is capable of receiving the web 14 in a single turn or portion of a turn, or in a wrap or coil having multiple turns. For example, the "rotary element" can be a roller, a mandrel, or a core 20 or spool that can be removably mounted on a spindle. The invention is generally discussed herein in terms of embodiments in which the rotating element is a core 20 that is mounted on a spindle.

The term "fixes" and like terms are used herein in the sense of an immobile rather than movable mounting.

Figure 1:
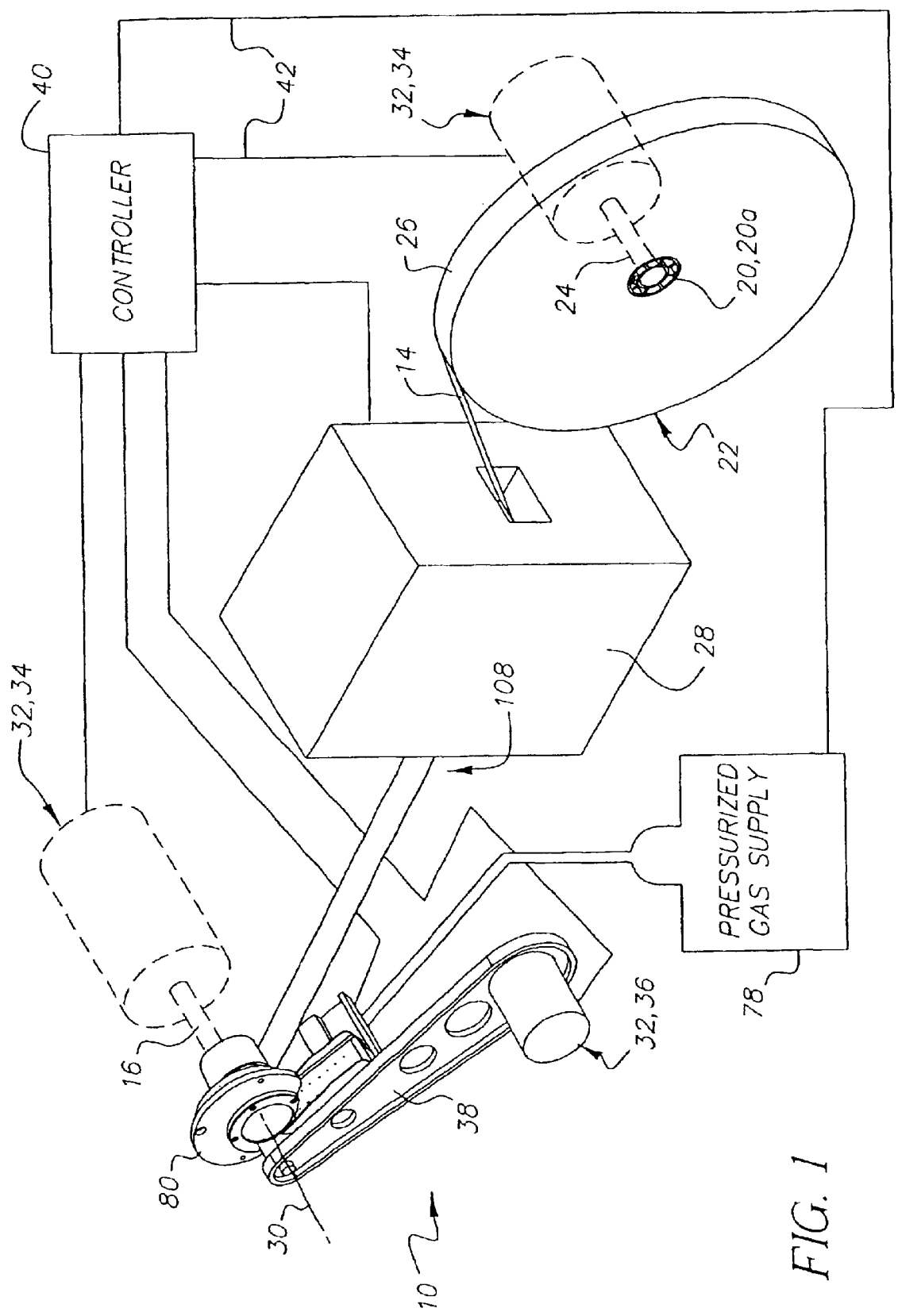
FIG. 1 is a semi-diagrammatical perspective view of an embodiment of the winding apparatus. The apparatus is shown at the start of winding, following cinching. The web extending to the cinching related components is shown in a tightened state.
Figure 2:
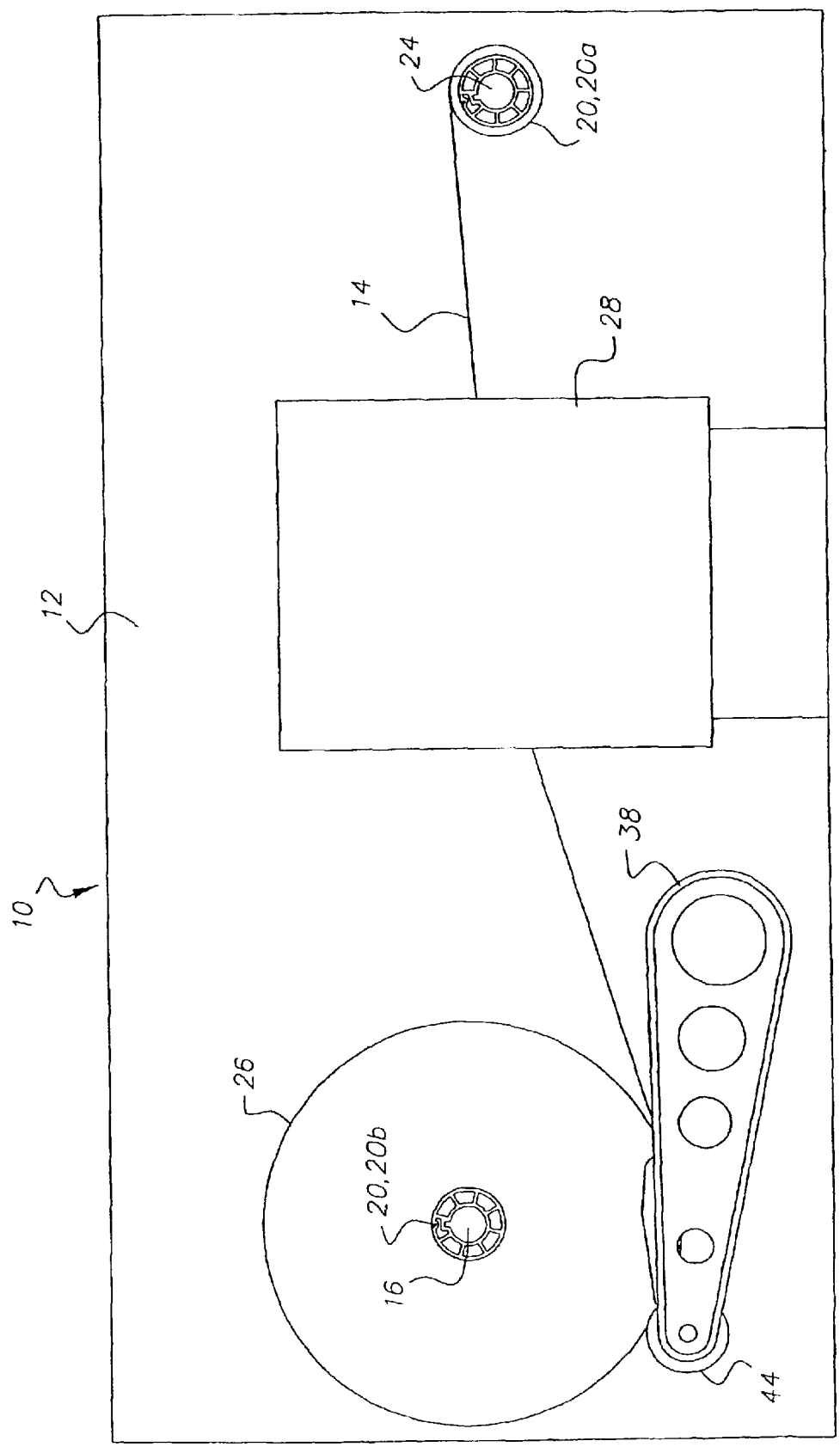
FIG. 2 is a front view of the apparatus of FIG. 1. For clarity, some features are not shown. The apparatus is shown after the completion of winding.
Figure 5:
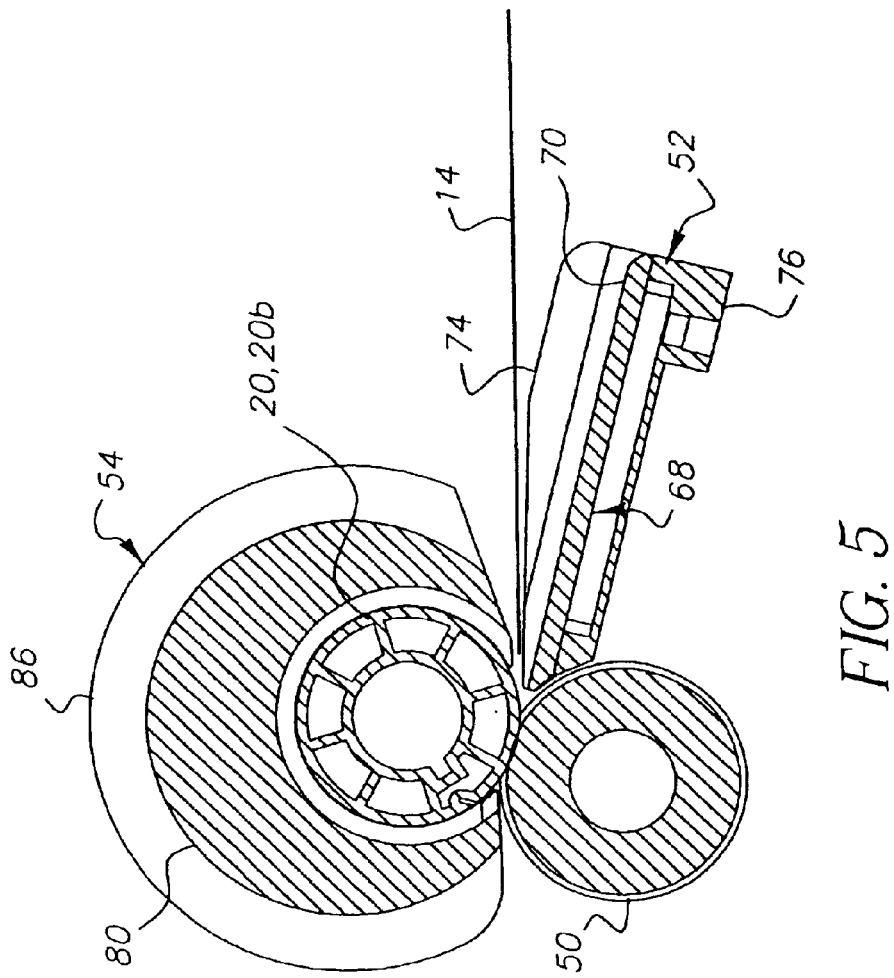
FIG. 5 is the same view as FIG. 4, but the cinching related components are shown following cinching.
Figure 3:
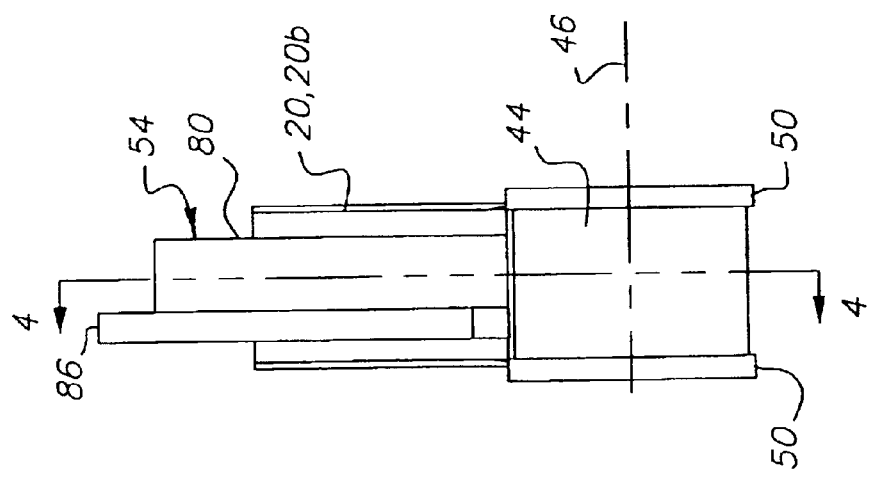
FIG. 3 is an end view of cinching related components of the apparatus of FIG. 1, including the builder roller, winding core, and scroll guide.
Figure 4:
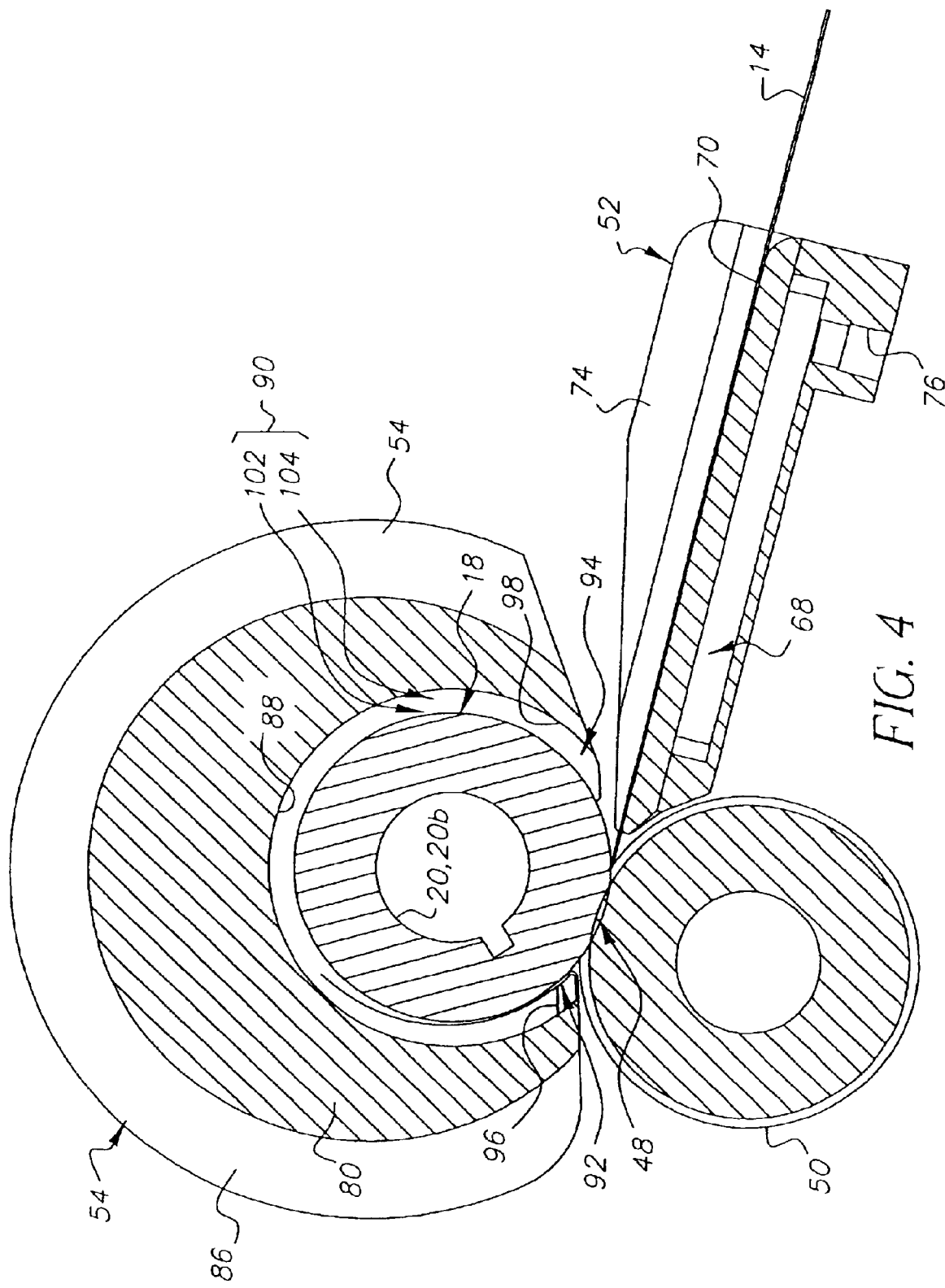
FIG. 4 is a cross-sectional view of the cinching related components, during cinching, taken substantially along line 4—4 of FIG. 3, including the guide shoe, which is not visible in FIG. 3.

Referring initially to FIGS. 1–2, the winding apparatus 10 has a base 12 to which other components are attached. The base 12 is illustrated in the figures as a vertically aligned panel, but this is not critical. For example, the base 12 can be aligned horizontally or an assembly of smaller members (not illustrated) can be used instead of the panel. In the illustrated embodiments, features of the apparatus that contact a web 14 are arranged on the front side of the base 12. This is a matter of convenience and can be changed to meet particular requirements. The invention is described in relation to and is particularly advantageous for the winding of photographic film. Webs of other materials can be wound in a like manner.

A winding spindle 16 is mounted to the base 12. The winding spindle 16 defines a core space (indicated by arrow 18) that receives a core 20, when a core 20 is mounted on the winding spindle 16. The spindle 16 is configured to hold and turn the core 20 without slippage. Features for this purpose, such as square spindles and matching core openings, are well known to those of skill in the art. In the illustrated embodiment, the spindle 16 has a protrusion that extends radially outward and is complementary to a pocket on the winding core 20.

A web supply 22 is mounted to the base 12 in spaced relation to the winding spindle 16. The configuration of the web supply 22 is not critical. In the figures, the web supply 22 is illustrated as an unwinding spindle 24 and a web roll 26 that is wound around an unwind core 20a that is mounted on the unwinding spindle 24. Depending upon web materials and other factors, other configurations of web supply 22, such as a bin of bifolded web, can be used instead. Additional components can also be provided as a part of the web supply 22 or separate from the web supply 22. For example, components such as idler rollers, tensioners, and cutters, can be provided.

The apparatus 10 can be limited to the function of rewinding film; however, other functions can also be provided between the web supply 22 and the winding spindle 16. Such functions are illustrated in FIGS. 1–2 by a function unit 28 in the shape of a box. Examples of function units include, include components for: digital scanning, optical projection, chemical processing, coating, laminating, and printing.

In the following, the core 20 positioned on the winding spindle 16 and the core 20 positioned on the unwinding spindle 24 are both the same; however, for convenience in the following discussion, the core 20 on the winding spindle 16 is sometimes referred to as the "winding core 20". Different reference designations, "20a" for the unwind core and "20b" for the winding core, are also used.

The winding spindle 16 rotates about a winding axis 30. This rotation is powered by a web drive 32. Additional components such as an unwinding spindle 24 can also be driven by the web drive 32. The web drive 32 includes one or more motors 34 and can optionally include a gear train or trains, belt or belts, or other transmission (not shown).

In the illustrated embodiment, the winding spindle 16 and unwinding spindle 24 are each directly driven by a separate electric motor 34. An additional motor 36 is provided that rotates a pivot arm 38. A microprocessor or other controller 40 is connected to the motors 34,36 and other controlled components by signal lines 42. Features and operation of suitable controllers for this purpose are well known to those of skill in the art. Operations can also be sequenced manually using switches.

Figure 7:
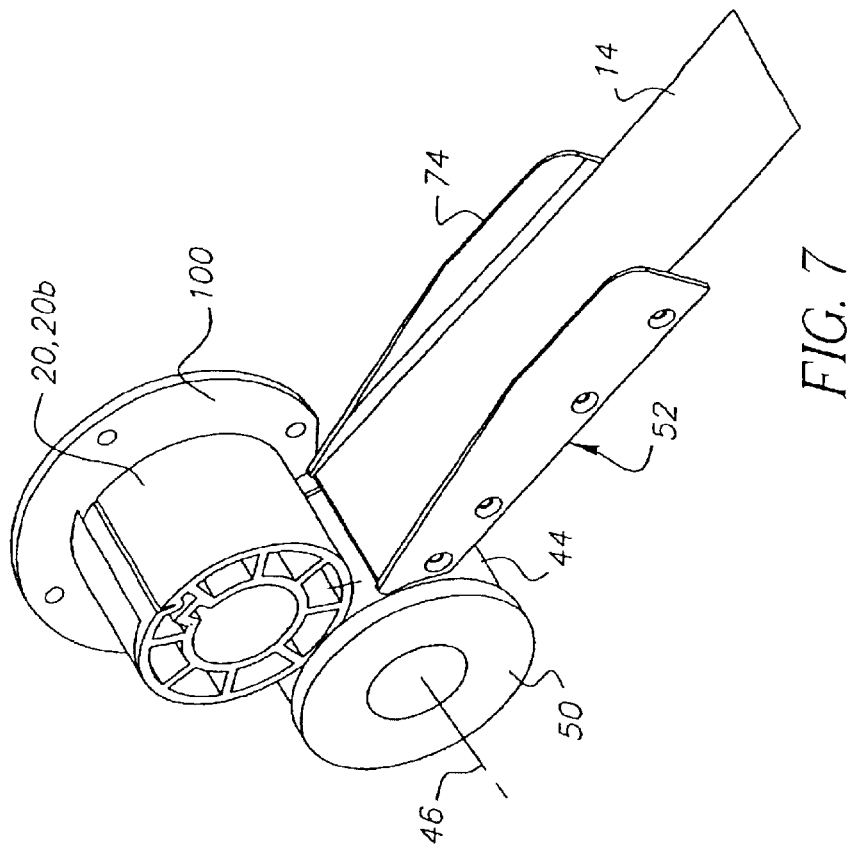
FIG. 7 is the same view as FIG. 6, shown at the same stage, but the scroll guide is removed to show the position of the free end of the filmstrip.
Figure 6:
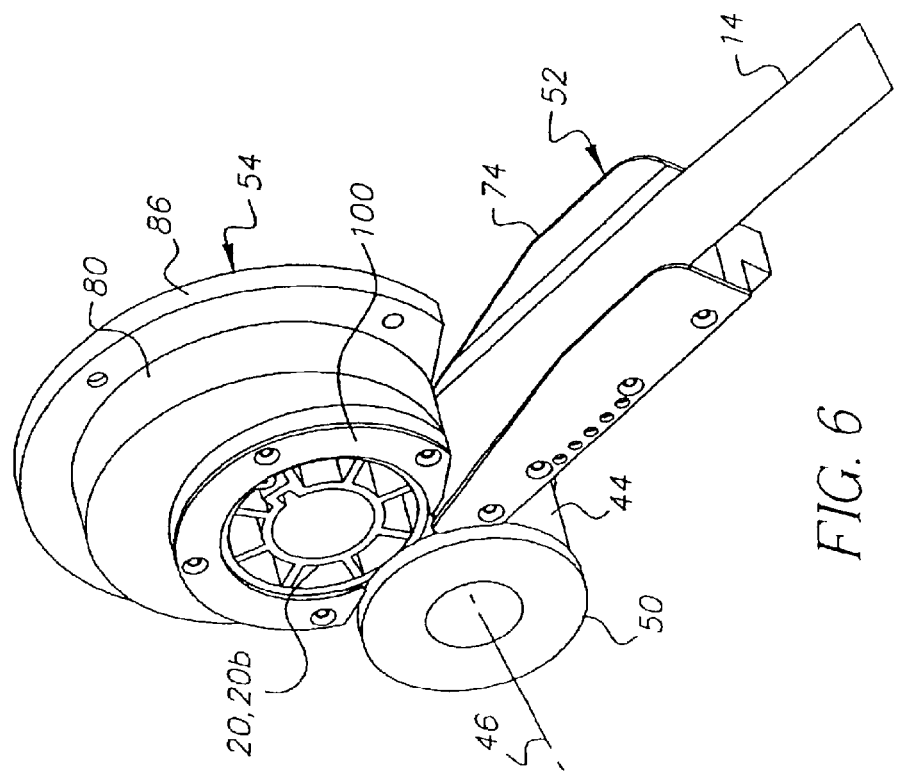
FIG. 6 is a perspective view of the cinching related components of the apparatus of FIG. 1, shown during cinching. The scroll guide and guide shoe are shown in use positions.
Figure 9:
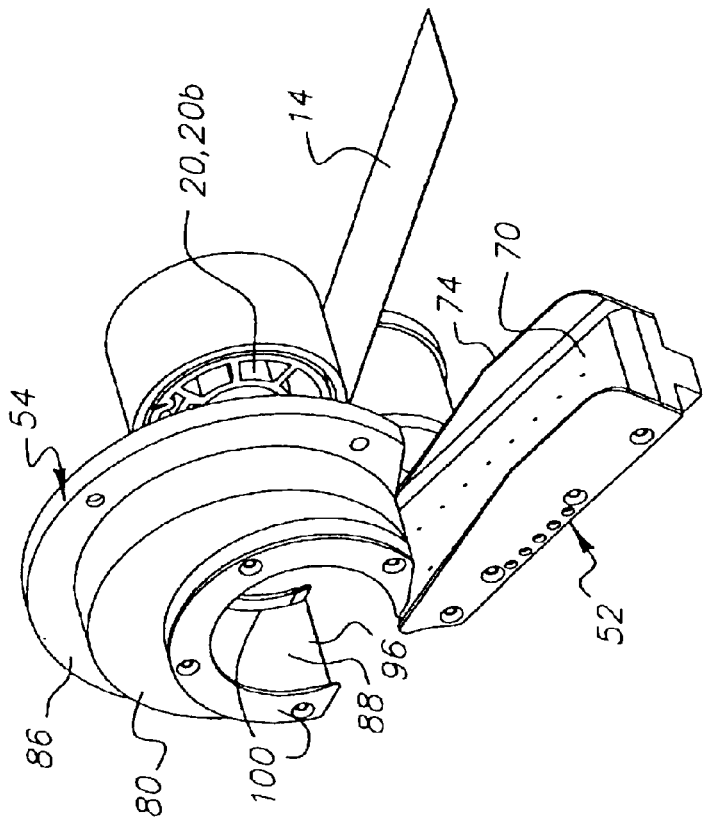
FIG. 9 is the same view as FIG. 6, but shows the cinching related components during winding, following cinching. The scroll guide and guide shoe are shown in standby positions.
Figure 8:
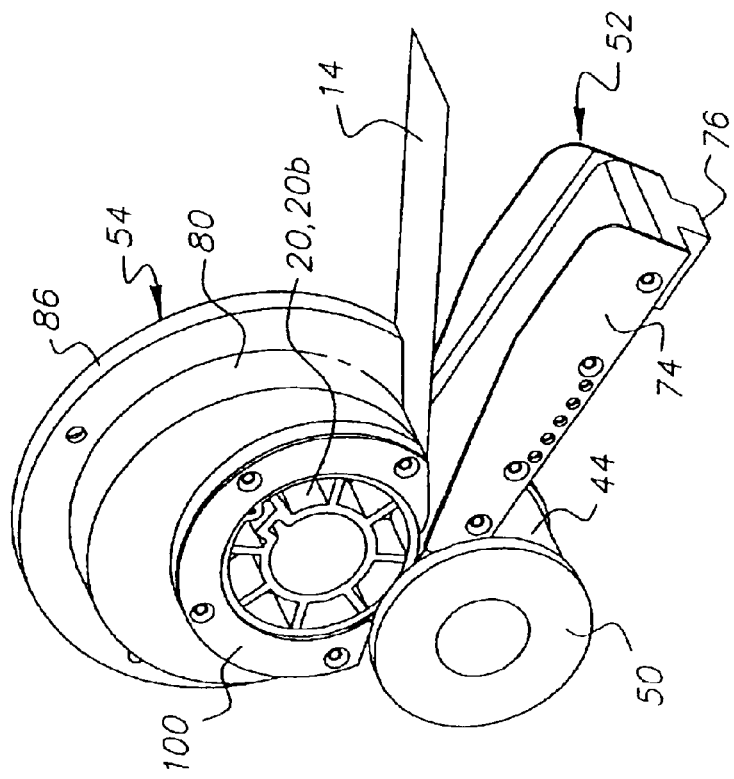
FIG. 8 is the same view as FIG. 6, but shows the cinching related components just after cinching is completed.
Figure 11:
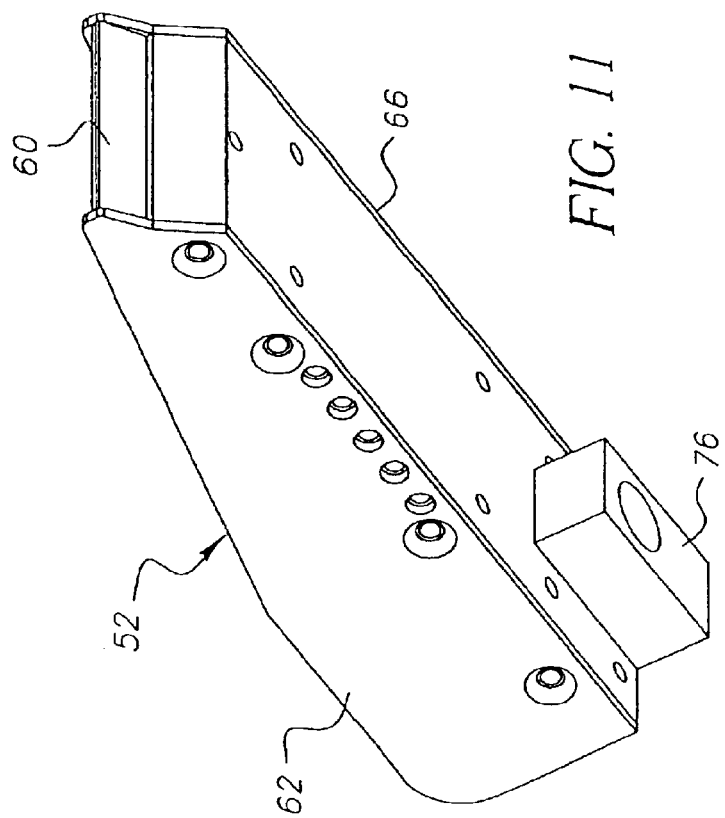
FIG. 11 is a bottom perspective view of the guide shoe of FIG. 10. The inner end of the guide shoe is at the upper right.
Figure 10:
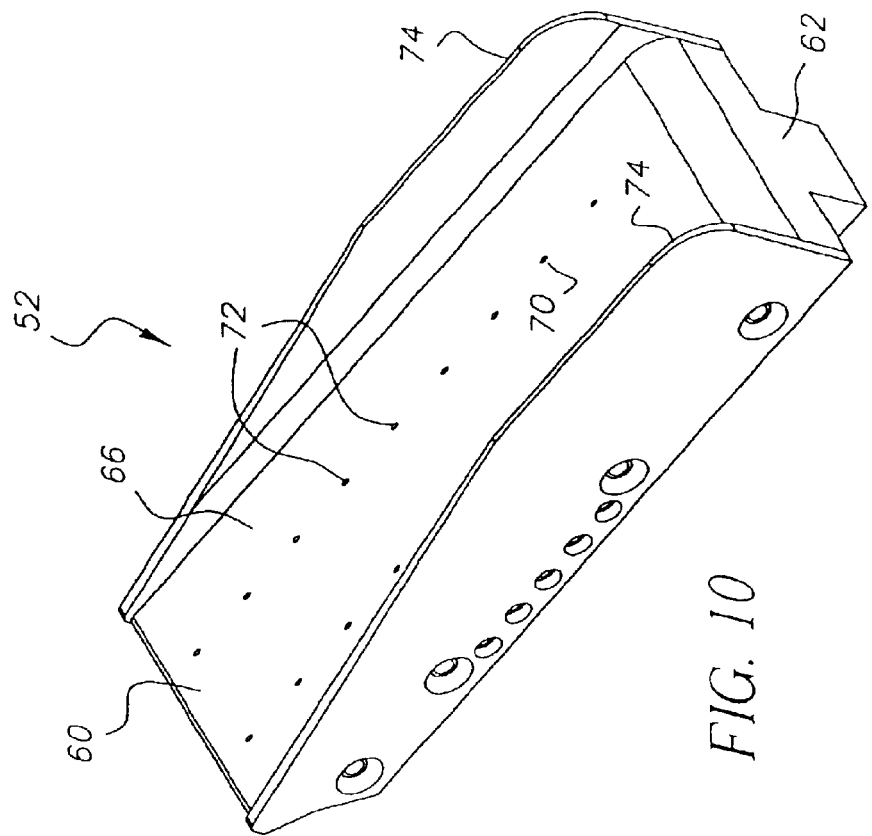
FIG. 10 is a top, perspective view of the guide shoe of the apparatus of FIG. 1. The outer end of the guide shoe is at the bottom right.
Figure 13:
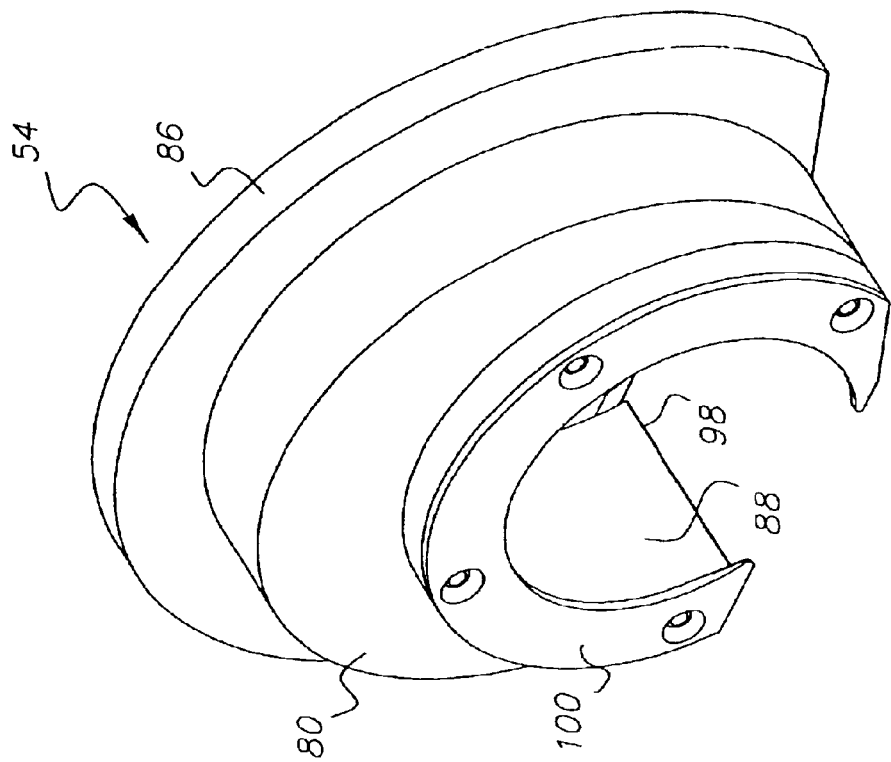
FIG. 13 is a front perspective view of the scroll guide of FIG. 12.
Figure 12:
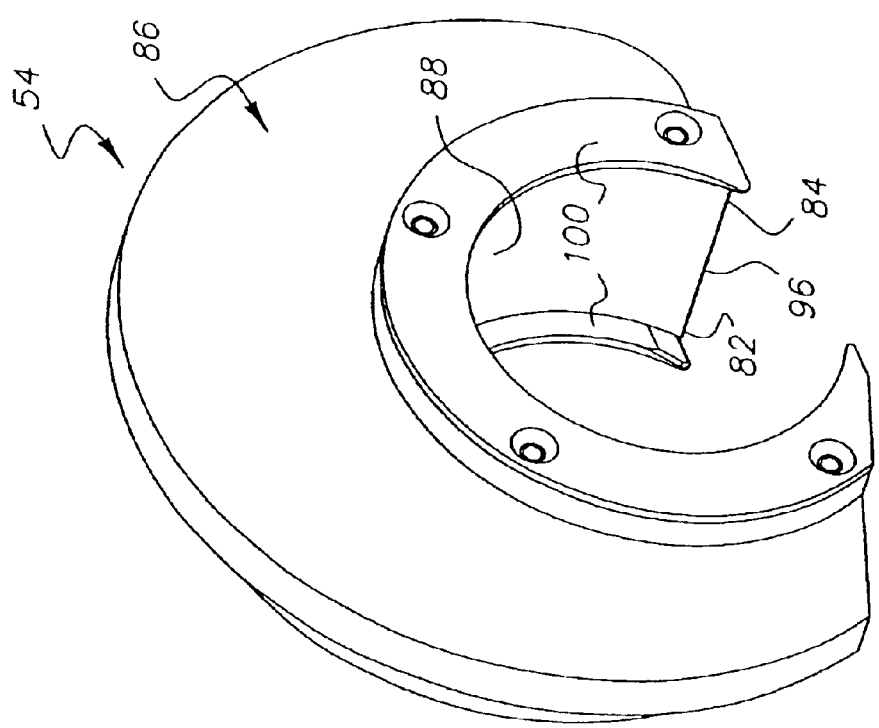
FIG. 12 is a rear perspective view of the scroll guide of the apparatus of FIG. 1.
Figure 14:
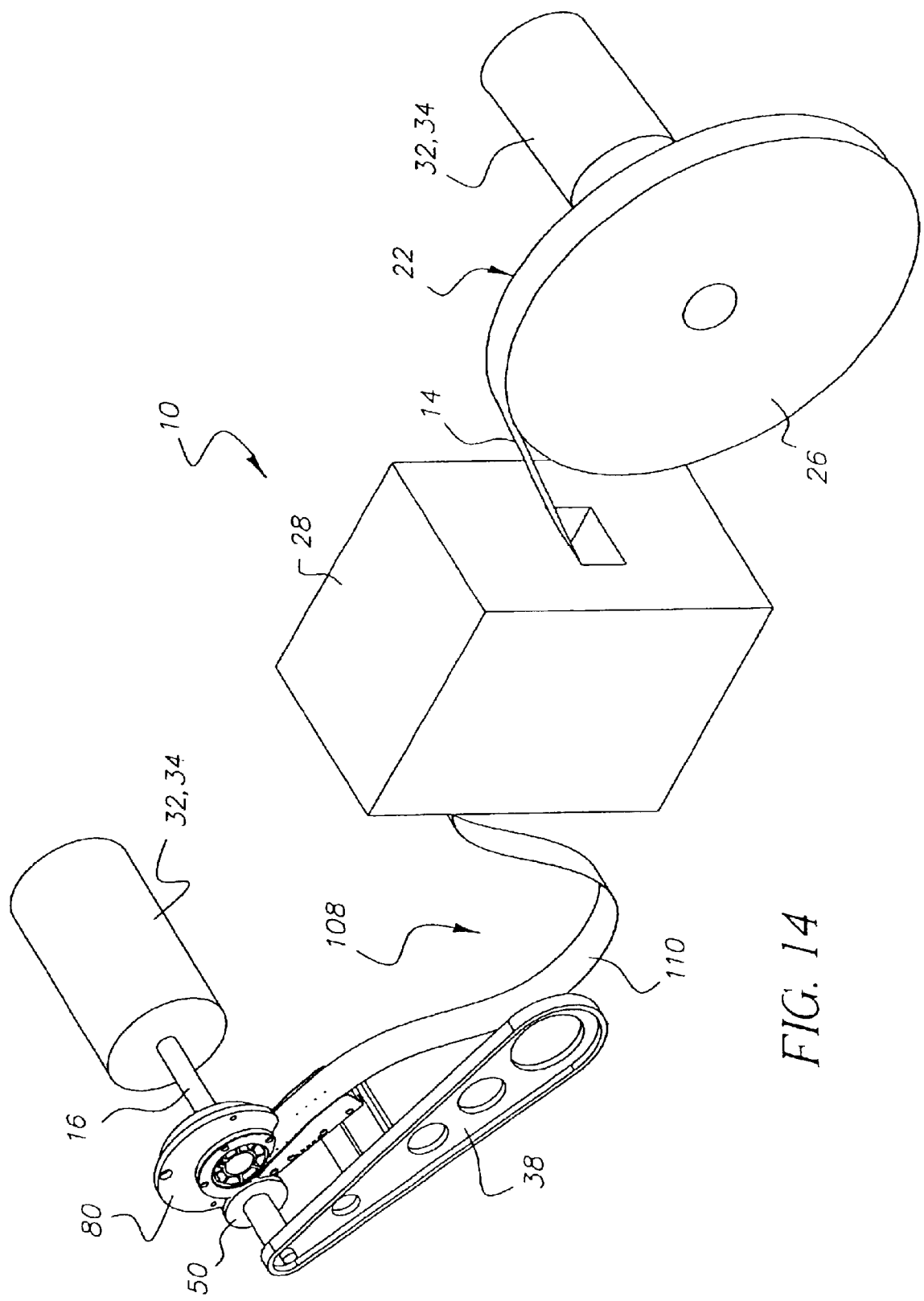
FIG. 14 is the same view as FIG. 1, but some components are removed for clarity and the web is shown is shown in a slack state.
Figure 15:
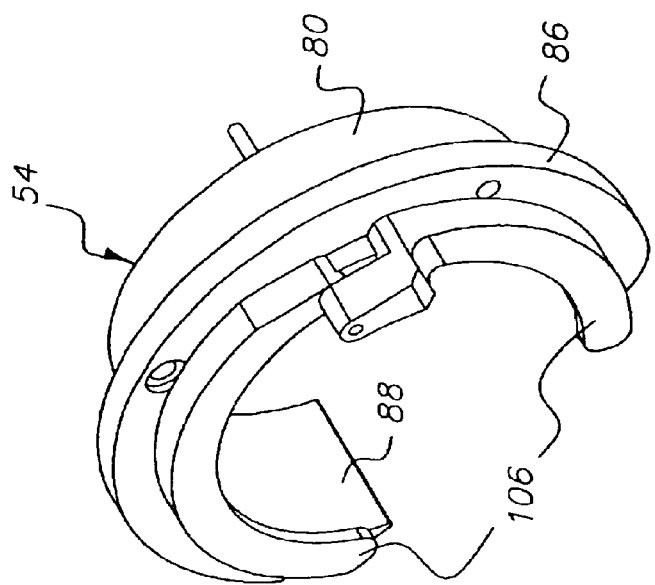
FIG. 15 is a perspective view of the scroll guide of another embodiment of the apparatus. The limit stop is shown in an extended position.
Figure 17:
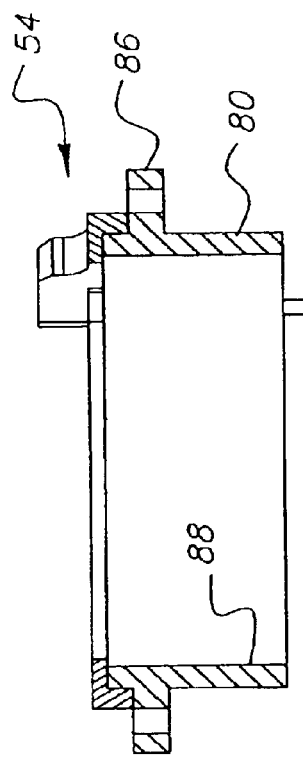
FIG. 17 is a cross-sectional view of the scroll guide of FIG. 16, taken substantially along line 17—17 of FIG. 16.
Figure 16:
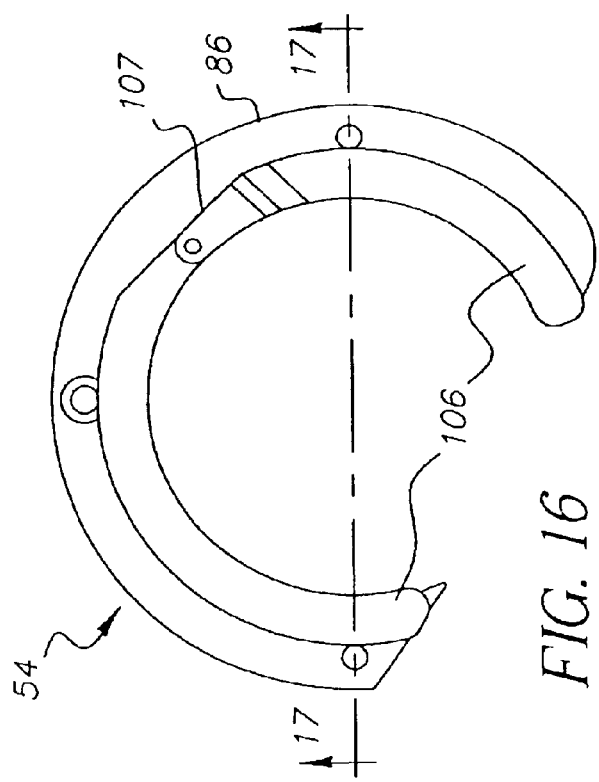
FIG. 16 is a front view of the scroll guide of FIG. 15. The limit stop is shown in the extended position.
Figure 18:
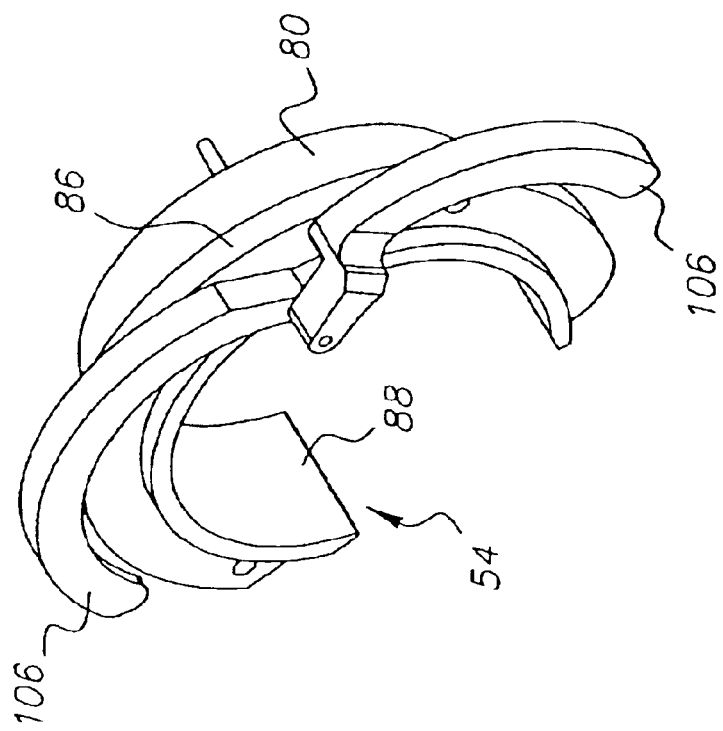
FIG. 18 is the same view as FIG. 15, but the limit stop is shown in a retracted position.
Figure 19:
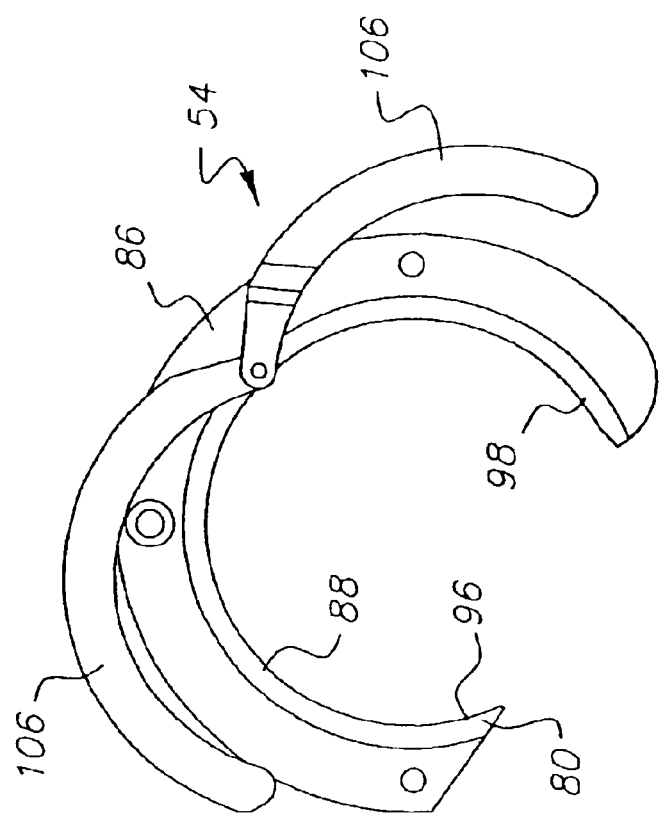
FIG. 19 is the same view as FIG. 16, but the limit stop is shown in a retracted position.
Figure 20:
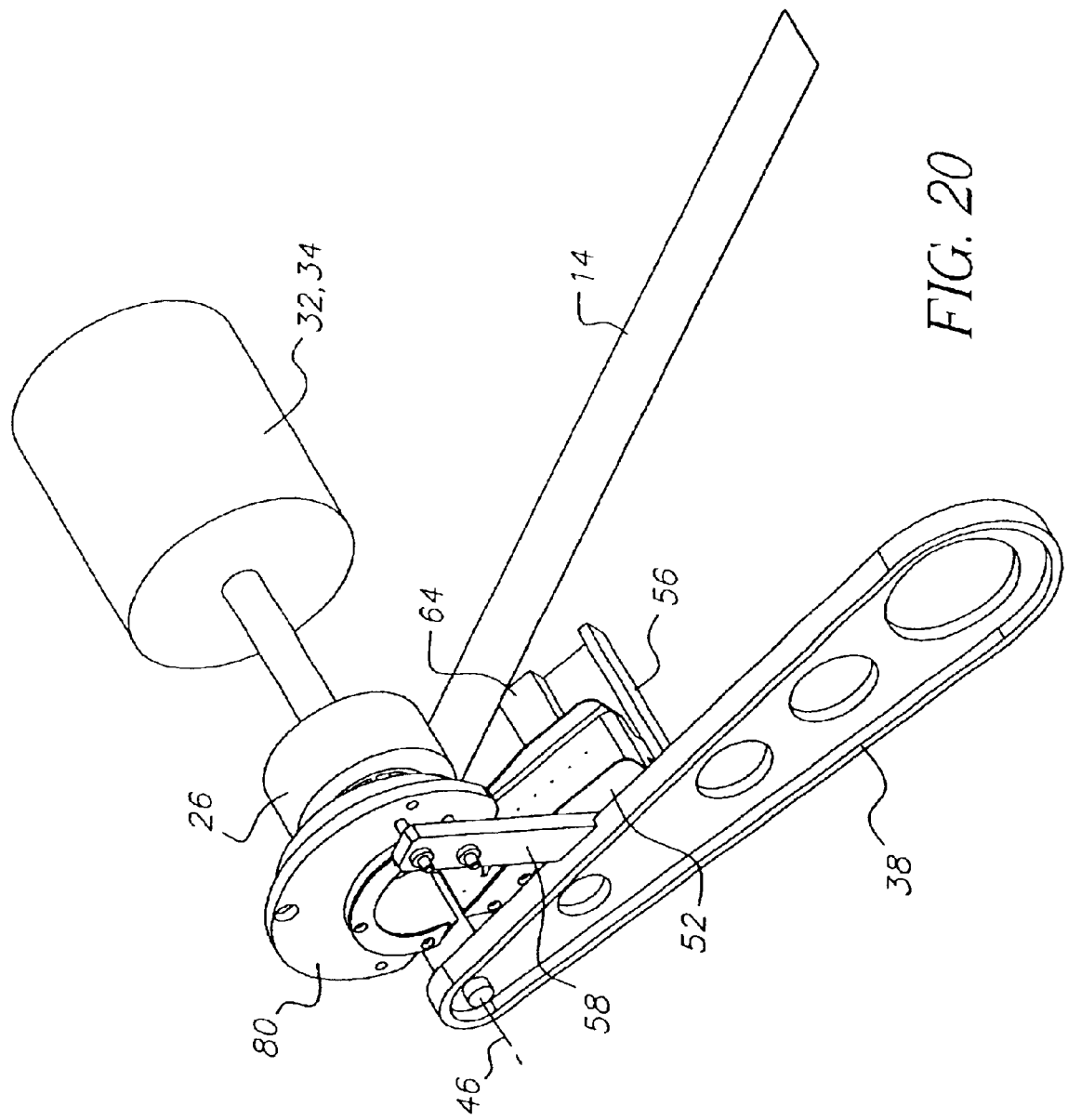
FIG. 20 is a perspective view of the cinching related pivot arm, guide supports, and the linear actuator. The apparatus is shown at the start of winding. The scroll guide and guide shoe are shown in the standby position.
Figure 21:
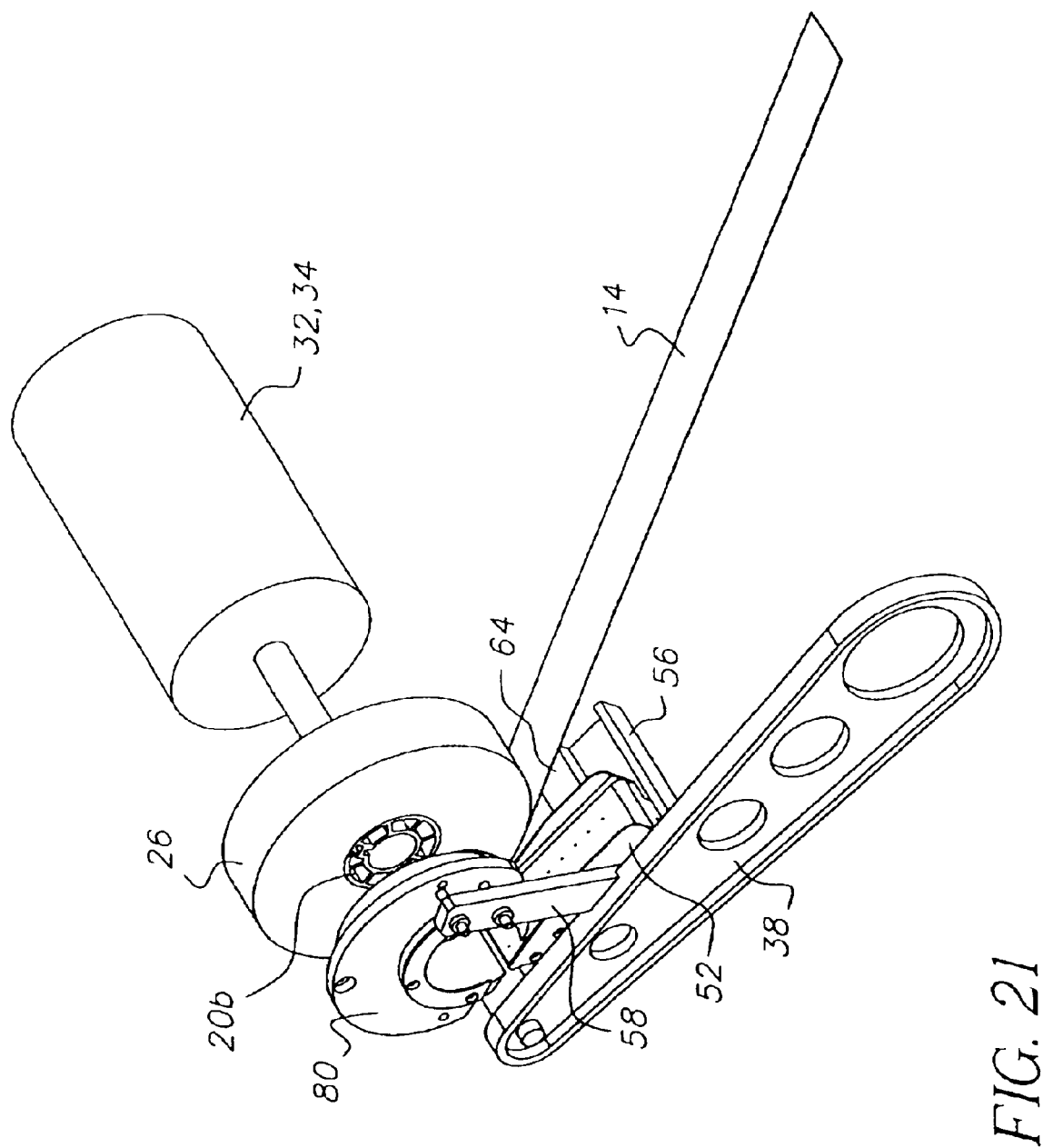
FIG. 21 is the same view as FIG. 20, but later during winding.
Figure 22:
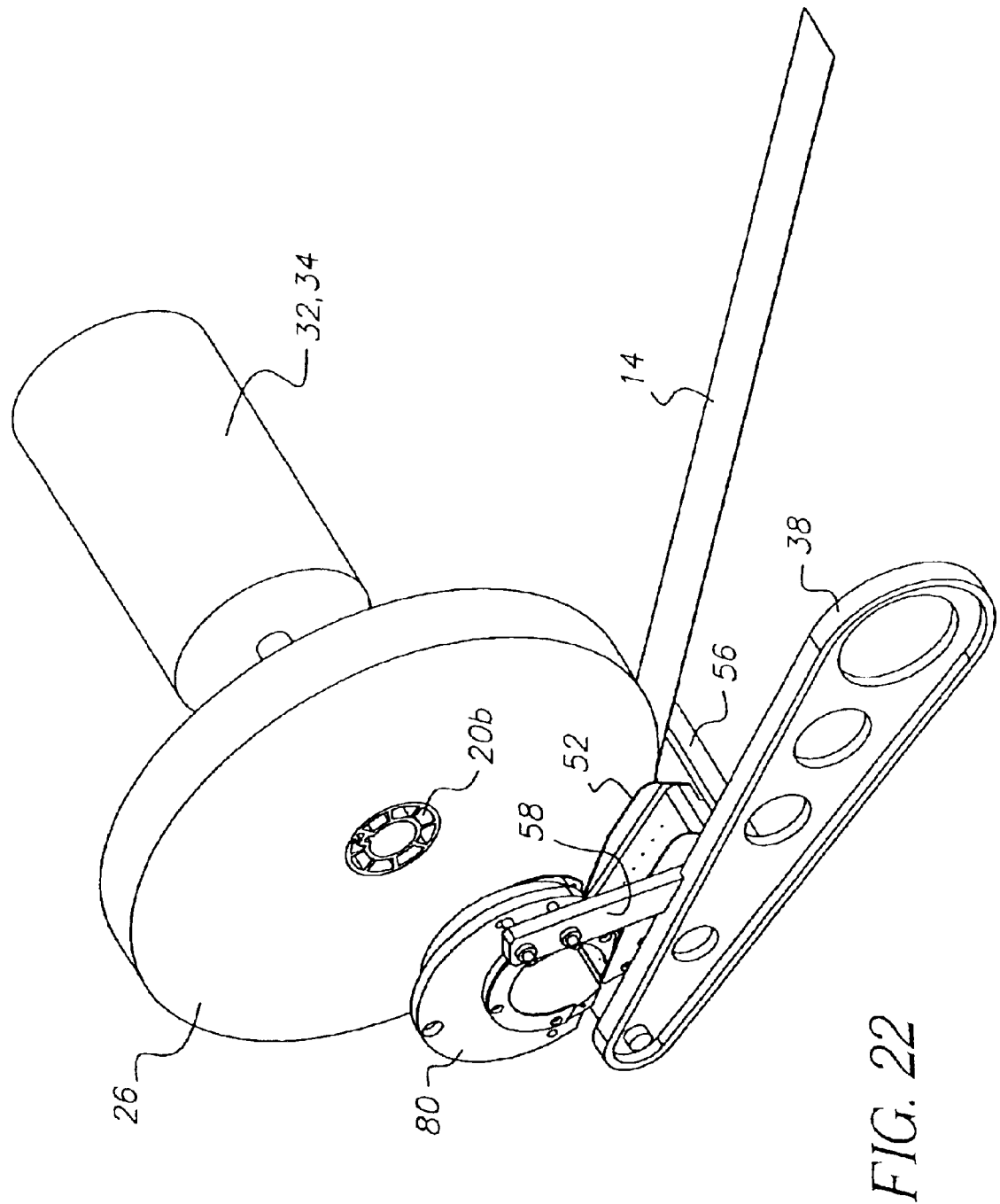
FIG. 22 is the same view as FIG. 20, but at the completion of winding.
Figure 23:
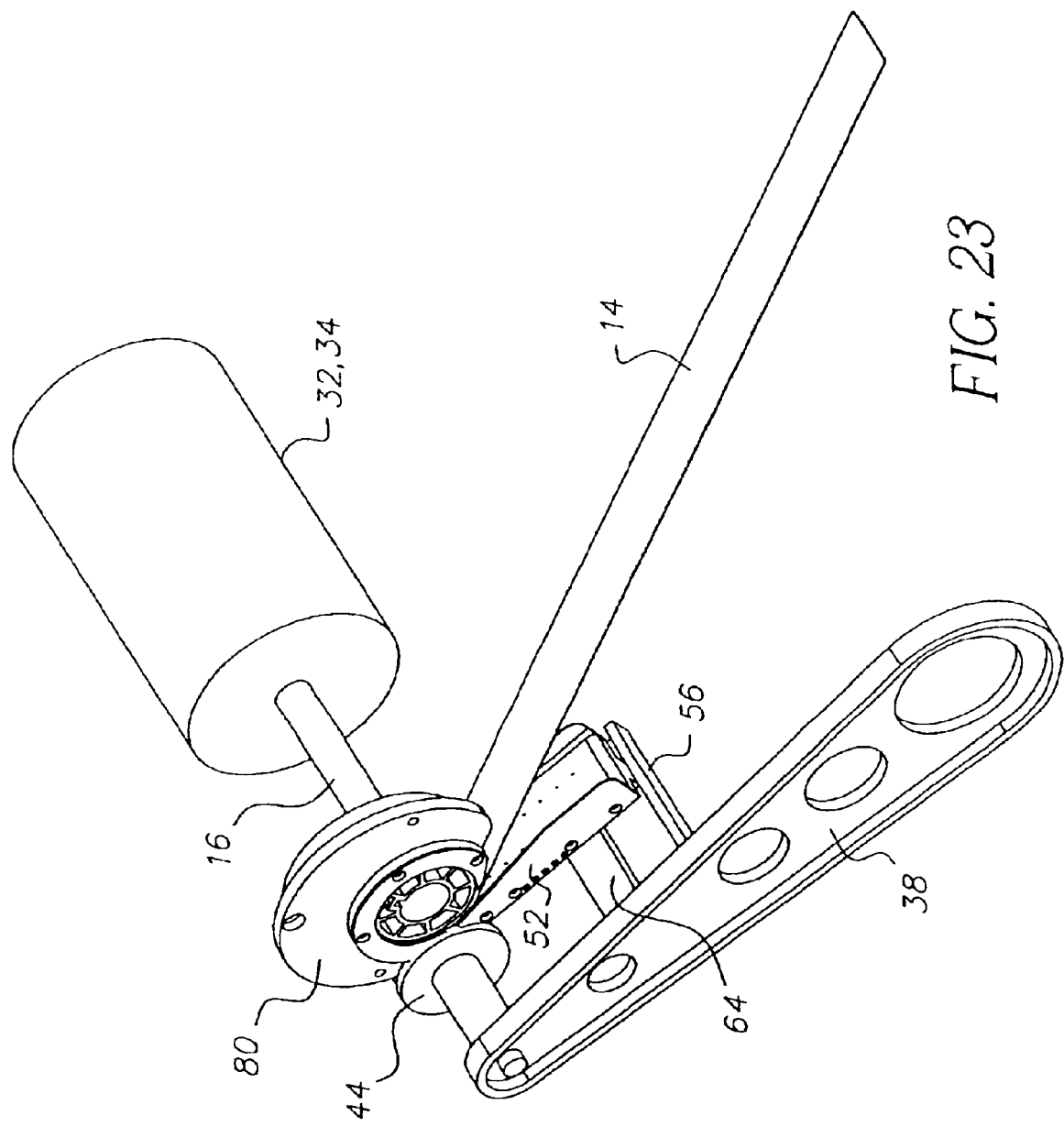
FIG. 23 is the same view as FIG. 20, but the apparatus is shown at the completion of cinching, prior to winding. The scroll guide and guide shoe are shown in the use position. For clarity, a guide support is not shown.

A builder roller 44 is rotatable about a builder roller axis 46 (see FIGS. 6–7) that is parallel to the winding axis 30. The builder roller 44 is positioned adjoining the winding core 20 so as to form a nip 48. In the illustrated embodiment, the builder roller 44 has a pair of opposed flanges 50 that adjoin either end of the winding core 20 adjacent the nip 48. The roller 44 is rotatably mounted to a pivot arm 38. The pivot arm 38 is pivotably mounted to the base 12. The location of the winding spindle 16 does not change and the builder roller 44 thus pivots relative to the winding spindle 16. The pivot arm motor 36 pivots the pivot arm 38 as needed to accommodate the growth of the web roll 26 on the winding core during winding. The rate of pivoting can be linked to spindle rotation or web travel or time and can be fixed or variable, as desired. Suitable sensors and equipment for this purpose are well known to those of skill in the art. As an alternative, the pivot arm motor 36 can be replaced by a pivot bearing (not shown) and a biasing member (not shown) that allows the web roll 26 to push the pivot arm 38 about the bearing as the web roll 26 on the winding core 20b grows.

If the apparatus 10 is to be used for winding a web of photographic film, then the builder roller 44 can be configured to contact the film only at opposed lateral margins of the film. This reduces the risk of pressure marking in image areas of the film, since the film is not contacted between the lateral margins. In this case, the nip 48 can be considered to have two spaced apart segments (not shown) separated by an enlarged gap, in which the web 14 is not squeezed. For other types of web 14, such as paper, that are not subject to pressure marking; it is convenient to provide a nip 48 that is continuous from side to side and continuously contacts the web 14 between lateral margins.

Referring now to FIGS. 4–13, cinching related components include a guide shoe 52 and a scroll guide 54. Both the guide shoe 52 and the scroll guide 54 are mounted to and pivot with the pivot arm 38. In the embodiment shown in the figures, a first guide support 56 mounts the guide shoe 52 to the pivot arm 38. A second guide support 58 mounts the scroll guide 54 to the guide shoe 52. Additional or alternative supports can be provided as needed for a particular use or as convenient. The scroll guide 54 and guide shoe 52 are movable in directions parallel to the winding axis 30 between a use position and a standby position. In the use position, both adjoin the builder roller 44 and winding core 20 or core space 18. The inner end 60 of the guide shoe 52 is located between and closely adjoins the builder roller 44 and the winding core 20 or core space 18. The outer end 62 is spaced from the builder roller 44. In the stand-by position, both the guide shoe 52 and scroll guide 54 are disposed in spaced relation to the builder roller 44 and winding core 20 or core space 18. Movement of the scroll guide 54 and guide shoe 52 between positions is provided by a linear actuator 64 that is mounted to the first guide support 56.

The scroll guide 54 and guide shoe 52 can, alternatively, be movable independent of each other. This approach is more complex and not particularly desirable, unless there are other concerns, such as spatial constraints in a particular use. Movement of the scroll guide 54 and guide shoe 52 can also be provided in other directions. For example, the guide shoe 52 can easily be moved in a plane that is perpendicular to the winding axis 30. The scroll guide 54 can be made in separable pieces to allow similar movement.

The guide shoe 52 has a body 66 that encloses a plenum 68. The body 66 has a chute wall 70 that has an array of bores 72 that communicate with the plenum 68. In the embodiments illustrated, the guide shoe 52 has a pair of opposed sidewalls 74 that laterally adjoin the chute wall 70. The sidewalls 74 and chute wall 70 together form a chute that is sized to accommodate the web 14. The guide shoe 52 is aligned with the nip 48, that is, the chute wall 70 leads toward the nip 48. The chute wall 70 is flat in the illustrated embodiments, but can be curved.

The body 66 of the guide shoe 52 has a port 76 that extends through to the plenum 68. A pressurized gas supply 78 is connected to the port 76. The controller can be operatively connected to the pressurized gas supply to limit gas deliver to those times the guide shoe 52 is in the use position or cinching is being done.

The number of bores 72 in the chute wall 70 depends upon the area and weight of a supported portion of the web 14. In a particular embodiment, the bores 72 each have a diameter in the range of about 0.012–0.032 inch (0.030–0.081 cm). The bores 72 are angled toward the nip 48. An angle of the bores 72 to the chute wall 70 is in the range of 5 to 45 degrees.

The scroll guide 54 has a deflector 80 that curves around the winding axis 30 and winding core 20. The deflector 80 has a pair of opposed axial ends 82,84. The deflector 80 has a uniform crescent-shaped cross-section. In the illustrated embodiments, an external reinforcing ridge 86 extends radially outward from the deflector 80 at the outer axial end of the deflector 80. The position the reinforcing ridge can be varied.

The deflector 80 has a deflecting wall 88 that faces the winding core 20. The deflecting wall 88 defines an imaginary arc that is radial to the winding axis 30. The deflecting wall 88 of the scroll guide 54 and the winding core 20 or core space 18 together define a scrolling space 90 having an entrance 92 adjoining the builder roller 44 and an exit 94 adjoining the inner end 60 of the chute wall 70.

In the illustrated embodiments, the deflecting wall 88 is continuous between an entrance margin 96 and an exit margin 98. Alternatively, the deflecting wall 88 can be discontinuous; but this can present a risk of the web 14 hanging up in a discontinuity. The deflecting wall 88 can extend from end to end of the winding core 20 or can be larger or smaller (in an axial direction). In particular embodiments, the winding core 20 and deflecting wall 88 have the same axial length. The deflector 80 can have friction reducing features such as surface relief, pressurized gas jets, roller bearings, or the like.

In particular embodiments, the scroll guide 54 has a limit stop 100 joined to the deflector 80 at one or both ends. In the illustrated embodiments, the limit stops 100 are roughly C-shaped and relatively thin, in an axial direction, in comparison to the deflector 80. The limit stop or stops 100 extend inward from the deflector 80 toward the winding axis 30. The limit stop or stops 100 prevent excessive lateral movement of the web 14 during cinching.

The use of the limit stops 100 and the extent of lateral movement allowed by the stops 100 can be varied to meet the requirements of a particular use and the propensity of a particular web 14 to telescope or otherwise cinch improperly. In the illustrated embodiments, the outer limit stop 100a can be conveniently fixed on the axial end of the deflector 80 and can be sized as desired. The inner limit stop 100b can be fixed to the inner axial end of the deflector 80, but is configured so as to permit withdrawal of the deflector 80 over the winding core 20 and initial turn or turns of the web 14. The inner limit stop 100 can be considered to define a subdivision of the scrolling space 90 into an axially inner removal zone or hollow cylinder 102, which has open axial ends; and an axially outward blocked zone or hollow cylinder 104, which has an inner axial end blocked by the inner limit stop 100.

In an alternative embodiment, the limit stop or stops 100c are movable in a plane perpendicular to the winding axis 30, between a retracted position and an extended position. In this embodiment, two stop portions 106 of each stop 100c are pivoted about a pin 107 that is fixed to the deflector 80. In the retracted position, the limit stop 100c blocks lateral web movement. In the extended position, the limit stop 100c is moved outward beyond the deflecting wall 88. Pivoting can be performed manually or by an automated device.

In cinching, gas flow and winding core rotation are first started. The guide shoe 52 utilizes a flow of gas from the bores 72 to propel the free end of the web 14 into the nip 48. The flow of gas causes a zone of reduced gas pressure to be formed between the chute wall 70 and the web 14, in accordance with the Bernoulli effect. This establishes a pressure differential across the web 14 and holds the web 14 in the guide shoe 52 on the film of flowing gas. The Bernoulli effect retains the web 14 along the chute wall 70. Gas issuing from the bores 72 flows in a film along the chute wall 70 and floats the web 14 toward the nip 48.

The path of the gas flow is disrupted at the nip 48, but the web 14 is then propelled by the rotating winding core 20 into the scrolling space 90. The distance between the inner end 60 of the guide shoe 52 and the nip 48 is short. This, along with the flowing gas, causes the web 14 to act as a beam and to bridge the gap into the nip 48. Continuing movement of the web 14 along the guide shoe 52 pushes the web 14 around the scroll guide 54 and back into the gas flow over the guide shoe 52. The free end is again entrained by the gas flow and reenters the nip 48.

Continued rotation of the winding spindle 16 causes the loop of web 14 within the scroll guide 54 to tighten against the winding core 20, resulting in cinching. The rotation of the winding spindle 16 is in the same direction as the movement of the web 14 around the scroll guide 54. Air jets, rollers, or the like (not shown) can be provided in the scroll guide 54 to reduce friction during the passage of the web 14 through the guide.

In particular embodiments of the invention, the web supply 22 is spaced from the winding spindle 16 by an intermediate space 108. The intermediate space 108 is free of idler rollers or guides or other features that would block movement of the web 14 in a plane that extends perpendicular to the winding axis 30. In this embodiment, a slack loop 110 of web 14 is formed prior to manual insertion of the web 14 into the guide shoe 52. The slack loop 110 is tightened away by growing web tension following cinching.

The invention is not limited to the embodiment shown and described. For example, the scroll guide can be shortened (not shown). This eliminates cinching, but allows passage of a web through a nip, followed by a redirection of the web. In this case, the builder roller is retained, but is better designated as "roller".

The invention has been described in detail with particular reference to certain preferred embodiments thereof, but it will be understood that variations and modifications can be effected within the spirit and scope of the invention.

What is claimed is:

1. A winding apparatus comprising:
    a rotary element rotatable about a winding axis;
    a roller disposed adjoining said rotary element, said roller and said rotary element together defining a nip;
    a guide shoe having a chute wall and a plenum, said chute wall being aligned with said nip, said chute wall having an inner end disposed between said roller and said rotary element and an outer end spaced from said roller, said chute wall having a plurality of bores communicating with said plenum; and
    a scroll guide having a use position; wherein said scroll guide extends around said rotary element, and said scroll guide and said rotary element together define a scrolling space having an entrance adjoining said roller and an exit adjoining said inner end of said chute wall.

2. The apparatus of claim 1 wherein said bores are angled toward said nip.

3. The apparatus of claim 2 further comprising a supply of fluid communicating with said plenum, said fluid flowing from said bores in a film along said chute surface to said nip.

4. The winding apparatus of claim 1 wherein said scroll guide is movable along said winding axis between said use position and a stand-by position, in which said deflector is axially displaced from said roller.

5. The winding apparatus of claim 4 wherein said guide shoe is movable, in directions parallel to said winding axis, between a use position adjoining said roller and a stand-by position spaced from said roller.

6. The winding apparatus of claim 4 wherein said scroll guide includes a deflector and a limit stop joined to said deflector, said deflector adjoining said rotary element along an imaginary arc radial to said winding axis, said limit stop adjoining said rotary element in a direction parallel to said winding axis.

7. The winding apparatus of claim 6 wherein said deflector extends continuously around said rotary element between said entrance and said exit, said deflector has a pair of opposed axial ends, and said limit stop is fixed to one of said axial ends.

8. The winding apparatus of claim 4 wherein said scroll guide includes a deflector and a pair of limit stops, said deflector extending around said winding axis in a cylindrical arc, said deflector having a pair of opposed axial ends, said limit stops being fixed to respective said axial ends, said limit stops each extending radially inward from said deflector toward said winding axis.

9. The winding apparatus of claim 1 wherein said scroll guide includes a deflector and a limit stop, said deflector continuously adjoining said rotary element in a direction radial to said winding axis, said limit stop being joined to said deflector, said limit stop having an extended position, wherein said limit stop extends radially inward from said deflector toward said winding axis, and a retracted position, wherein said limit stop is disposed radially outward relative to said extended position.

10. A winding apparatus comprising:
    a rotary element rotatable about a winding axis;
    a roller disposed adjoining said rotary element, said roller and said rotary element together defining a nip;
    a guide shoe having a chute wall, a pair of opposed sidewalls, and a plenum, said sidewalls being joined to said chute wall, said chute wall being aligned with said nip, said chute wall having an inner end closely adjoining said nip and an outer end spaced form said nip, said chute wall having a plurality of bores communicating with said plenum, said bores being angled toward said nip, said bores defining a fluid flow path extending along said chute wall to said nip; and
    a deflector having opposed entrance and exit margins, said deflector having a use position, wherein said entrance margin adjoins said roller and said exit margin adjoins said inner end of said chute wall.

11. The winding apparatus of claim 10 wherein said deflector is movable along said winding axis between said use position and a stand-by position, in which said deflector is axially displaced from said roller.

12. The winding apparatus of claim 11 wherein said guide shoe is movable, in directions parallel to said winding axis, between a use position adjoining said builder roller and a stand-by position spaced from said roller.

13. The winding apparatus of claim 11 wherein said deflector has a pair of opposed axial ends and said winding apparatus further comprises a limit stop joined to one of said axial ends, said limit stop extending radially inward from said deflector toward said winding axis.

14. A winding apparatus comprising:
    a winding spindle rotatable about a winding axis;
    a roller disposed adjoining said winding spindle, said winding spindle and said roller together defining a cylindrical core space and a nip disposed between said core space and said roller;
    a guide shoe having a chute wall and a plenum wall, said walls together enclosing a plenum, said chute wall being flat, said chute wall being aligned with said nip; said chute wall having a plurality of bores communicating with said plenum, said chute wall having an inner end disposed between said roller and said core space and an outer end spaced end spaced from said roller; and
    a deflector having opposed entrance and exit margins, said deflector having a use position, wherein said entrance margin adjoins said roller and said exit margin adjoins said inner end of said chute wall.

15. The apparatus of claim 14 wherein said bores are angled toward said nip.

16. The winding apparatus of claim 14 wherein said deflector is movable along said winding axis between said use position and a stand-by position, in which said deflector is axially displaced from said roller.

17. The winding apparatus of claim 16 wherein said guide shoe is movable, in directions parallel to said winding axis, between a use position adjoining said builder roller and a stand-by position spaced from said roller.

18. The winding apparatus of claim 16 further comprising a limit stop joined to said deflector, said limit stop extending radially inward from said deflector toward said winding axis.

19. The winding apparatus of claim 16 comprising a pair of limit stops fixed to respective axial ends of said deflector, said limit stops each extending radially inward from said deflector toward said winding axis.

20. The winding apparatus of claim 16 further comprising a limit stop joined to said deflector, said limit stop having an extended position, wherein said limit stop extends radially inward from said deflector toward said winding axis, and a retracted position, wherein said limit stop is disposed radially outward relative to said extended position.

21. The winding apparatus of claim 14 wherein said roller has a pair of opposed flanges and said nip is located between said flanges and said guide shoe has a pair of opposed sidewalls laterally adjoining said chute wall.

22. A winding apparatus comprising:
a rotary element rotatable about a winding axis;
a roller disposed adjoining said rotary element, said roller and said rotary element together defining a nip;
a supply of fluid;
a guide shoe having a chute wall aligned with said nip, said chute wall directing said fluid in a flow into said nip; and
a scroll guide having a use position wherein said scroll guide extends around said rotary element;
wherein said scroll guide and said rotary element together define a scrolling space having an entrance adjoining said roller and an exit adjoining an inner end of said chute wall.

23. The winding apparatus of claim 22 wherein said guide shoe is movable, in directions parallel to said winding axis, between a use position adjoining said roller and a stand-by position spaced from said roller.

24. The winding apparatus of claim 22 wherein said inner end of said chute wall is disposed between said roller and said rotary element.

25. A winding apparatus comprising:
a rotary element rotatable about a winding axis;
a roller disposed adjoining said rotary element, said roller and said rotary element together defining a nip;
a supply of fluid;
a guide shoe having a chute wall aligned with said nip, said chute wall directing said fluid in a flow into said nip; and
a scroll guide having a use position wherein said scroll guide extends around said rotary element;
wherein said guide shoe has a body enclosing a plenum, said body having a chute wall aligned with said nip, said chute wall having an inner end disposed between said roller and said rotary element and an outer end spaced from said roller, said chute wall having a plurality of bores communicating with said plenum.

26. The winding apparatus of claim 25 wherein said roller has a pair of opposed flanges and said nip is located between said flanges.

27. The winding apparatus of claim 26 wherein said guide shoe has a pair of opposed sidewalls laterally adjoining said chute wall.

28. The apparatus of claim 25 wherein said bores are angled toward said nip.

29. A winding apparatus comprising:
a rotary element rotatable about a winding axis;
a roller disposed adjoining said rotary element, said roller and said rotary element together defining a nip;
a supply of fluid;
a guide shoe having a chute wall aligned with said nip, said chute wall directing said fluid in a flow into said nip; and
a scroll guide having a use position wherein said scroll guide extends around said rotary element;
wherein said scroll guide includes a deflector and a limit stop joined to said deflector, said deflector adjoining said rotary element along an imaginary arc radial to said winding axis, said limit stop adjoining said rotary element in a direction parallel to said winding axis.

30. A winding apparatus comprising:
a rotary element rotatable about a winding axis;
a roller disposed adjoining said rotary element, said roller and said rotary element together defining a nip;
a supply of fluid;
a guide shoe having a chute wall aligned with said nip, said chute wall directing said fluid in a flow into said nip; and
a scroll guide having a use position wherein said scroll guide extends around said rotary element;
wherein said scroll guide includes a deflector and a pair of limit stops, said deflector extending around said winding axis in a cylindrical arc, said deflector having a pair of opposed axial ends, said limit stops being fixed to respective said axial ends, said limit stops each extending radially inward from said deflector toward said winding axis.

31. A winding apparatus comprising:
a rotary element rotatable about a winding axis;
a roller disposed adjoining said rotary element, said roller and said rotary element together defining a nip;
a supply of fluid;
a guide shoe having a chute wall aligned with said nip, said chute wall directing said fluid in a flow into said nip; and
a scroll guide having a use position wherein said scroll guide extends around said rotary element;
wherein said scroll guide includes a deflector and a limit stop, said deflector continuously adjoining said rotary element in a direction radial to said winding axis, said limit stop being joined to said deflector, said limit stop having an extended position, wherein said limit stop extends radially inward from said deflector toward said winding axis, and a retracted position, wherein said limit stop is disposed radially outward relative to said extended position.

* * * * *

UNITED STATES PATENT AND TRADEMARK OFFICE
CERTIFICATE OF CORRECTION

PATENT NO.         : 6,942,175 B2
APPLICATION NO. : 10/460552
DATED              : September 13, 2005
INVENTOR(S)        : Joesph A. Watkins et al It is certified that error appears in the above-identified patent and that said Letters Patent is hereby corrected as shown below:

On the title page item (74) Attorney, Agent or Firm     insert -- *Attorney, Agent or Firm*—Robert Luke Walker --

Signed and Sealed this

Twenty-second Day of August, 2006

JON W. DUDAS
*Director of the United States Patent and Trademark Office*